(12) United States Patent
Przybyla et al.

(10) Patent No.: US 11,686,804 B2
(45) Date of Patent: Jun. 27, 2023

(54) ULTRASONIC RANGE SENSING ENABLES MEASURED SOCIAL CONTACT

(71) Applicant: InvenSense, Inc., San Jose, CA (US)

(72) Inventors: Richard J. Przybyla, Piedmont, CA (US); Sebastien Riccardi, Brezins (FR); Benoît Lachal, Espoo (FI)

(73) Assignee: InvenSense, Inc., San Jose, CA (US)

( * ) Notice: Subject to any disclaimer, the term of this patent is extended or adjusted under 35 U.S.C. 154(b) by 245 days.

(21) Appl. No.: 17/216,146

(22) Filed: Mar. 29, 2021

(65) Prior Publication Data

US 2021/0215786 A1 Jul. 15, 2021

Related U.S. Application Data

(63) Continuation-in-part of application No. 17/156,242, filed on Jan. 22, 2021, now Pat. No. 11,543,486.
(Continued)

(51) Int. Cl.
*G01S 3/808* (2006.01)
*G01S 5/30* (2006.01)
*G01S 15/87* (2006.01)

(52) U.S. Cl.
CPC ............ *G01S 3/808* (2013.01); *G01S 5/30* (2013.01); *G01S 15/876* (2013.01)

(58) Field of Classification Search
CPC ........... H04W 56/004; H04W 56/0045; H04W 56/005; H04W 4/021; H04W 4/02; H04W 4/024; H04W 4/023; H04W 4/025; H04W 4/027; H04W 4/06; H04W 4/08; H04W 4/10; H04W 4/12; H04W 4/14; H04W 4/16; H04W 4/20; H04W 4/203; H04W 4/21; H04W 4/23; H04L 5/00; H04L 5/003;
(Continued)

(56) References Cited

U.S. PATENT DOCUMENTS 2,724,816 A 11/1955 Goodell
4,649,385 A 3/1987 Aires et al.
(Continued)

FOREIGN PATENT DOCUMENTS

WO WO2017204802 5/2016

OTHER PUBLICATIONS

Peng et al., "BeepBeep: A High-Accuracy Acoustic-Based System for Ranging and Localization Using COTS Devices", AMC Transactions on Embedded Computing Systems, vol. 11, No. 1, Article 4, pp. 1-29, Mar. 2012.
(Continued)

*Primary Examiner* — Daniel L Murphy
*Assistant Examiner* — Amie M Ndure
(74) *Attorney, Agent, or Firm* — DLA Piper LLP (US)

(57) ABSTRACT

A method, system and computer readable medium for Ultrasound contact tracing comprising receiving one or more advertise messages determining a base station from the one or more advertise messages wherein the base station generates a broadcast order from at least the one or more advertise messages. A broadcast order is determined and an ultrasound message is sent according to the broadcast order. A detection period for ultrasound messages is initiated according to the broadcast order and a user may be notified of a detected ultrasound message.

24 Claims, 8 Drawing Sheets

Related U.S. Application Data which is a continuation of application No. 15/354,892, filed on Nov. 17, 2016, now Pat. No. 10,901,064, which is a continuation of application No. PCT/US2016/034176, filed on May 25, 2016.

(60) Provisional application No. 63/038,657, filed on Jun. 12, 2020.

(58) Field of Classification Search
CPC ..... H04L 5/0044; H04L 5/0048; H04L 5/005; H04L 5/14; H04L 7/00; H04L 7/0008; H04L 65/60; H04L 67/00; H04B 7/0452; H04B 7/0619; G01S 11/14; G01S 5/30; G01S 15/876; G01S 3/808
See application file for complete search history.

(56) References Cited

U.S. PATENT DOCUMENTS

| | | | |
|---|---|---|---|
| 6,317,386 | B1 | 11/2001 | Ward |
| 6,493,649 | B1 | 12/2002 | Jones et al. |
| 10,901,064 | B2 | 1/2021 | Przybyla et al. |
| 2002/0035416 | A1 | 3/2002 | De Leon |
| 2003/0142587 | A1 | 7/2003 | Zeitzew |
| 2004/0183661 | A1 | 9/2004 | Bowman |
| 2008/0231498 | A1 | 9/2008 | Menzer et al. |
| 2008/0259732 | A1 | 10/2008 | Booij et al. |
| 2009/0070797 | A1 | 3/2009 | Ramaswamy et al. |
| 2010/0228130 | A1 | 9/2010 | Chiang et al. |
| 2011/0222528 | A1 | 9/2011 | Chen |
| 2012/0177265 | A1 | 7/2012 | Yoshiara et al. |
| 2014/0160893 | A1 | 6/2014 | Amm et al. |
| 2015/0006633 | A1* | 1/2015 | Vandwalle .......... H04L 67/1051 709/204 |
| 2016/0204879 | A1 | 7/2016 | Niewczas et al. |
| 2017/0024531 | A1 | 1/2017 | Malaviya |
| 2017/0094464 | A1* | 3/2017 | Chu .......................... G01S 1/00 |
| 2017/0223498 | A1* | 8/2017 | Banavar ................ H04W 4/021 |
| 2017/0343637 | A1 | 11/2017 | Przybyla et al. |
| 2018/0293870 | A1 | 10/2018 | LeJeune, Jr. |
| 2019/0246253 | A1* | 8/2019 | Ryu ........................ H04L 67/04 |
| 2021/0165069 | A1 | 6/2021 | Przybyla et al. |
| 2022/0045554 | A1* | 2/2022 | Leabman ................ H02J 50/40 |

OTHER PUBLICATIONS

International Search Report and Written Opinion in International Application No. PCT/US2021/035755, dated Sep. 9, 2021.

European Supplementary Search Report dated Jun. 25, 2020 for Application EP 16903325.5.

Final Office Action for U.S. Appl. No. 15/354,892, dated May 13, 2020.

International Search Report for PCT/US2016/034176 dated Sep. 1, 2016.

Non-Final Office Action for U.S. Appl. No. 15/354,892, dated Nov. 7, 2019.

Notice of Allowance for U.S. Appl. No. 15/354,892, dated Sep. 18, 2020.

Partial European Search Report dated Jan. 7, 2020 for European Patent Application No. EP169033250

Styger.Eric, Tutorial-Ultrasonic Ranging with the Freedom Board, MCU on Eclipse, Jan. 1, 2013, pp. 16-17, [online], [retrieved on Mar. 8, 2016] Retrieved from the Internet ,url:https//mcuoneclipse.com/2013/01/01/tutorial-ultrasonic-ranging-with-the-freedom-board/>.

U.S. Appl. No. 17/156,242 to Richard J. Przybyla et al. entitled "Ultrasonic Beacon Tracking" filed Jan. 22, 2021.

U.S. Appl. No. 63/038,657 to Richard J. Przybyla et al. entitled "Ultrasonic Range Sensing Enables Measured Social Contact" filed Jun. 12, 2020.

* cited by examiner

ULTRASONIC RANGE SENSING ENABLES MEASURED SOCIAL CONTACT

CLAIM OF PRIORITY

This application is a continuation in part of U.S. patent application Ser. No. 17/156,242 filed Jan. 22, 2021, the entire contents of which are incorporated herein by reference in their entirety.

U.S. patent application Ser. No. 17/156,242 is a continuation of U.S. patent application Ser. No. 15/354,892 filed Nov. 17, 2017, the entire contents of which are incorporated herein by reference in their entirety.

U.S. patent application Ser. No. 15/354,892 is a continuation of International Patent Application Number PCT/US2016/034176 filed May 25, 2016, the entire contents of which are incorporated herein by reference in their entirety.

This application claims the priority benefit of U.S. Provisional patent Application No. 63/038,657 filed Jun. 12, 2020 the entire contents of which are incorporated herein by reference in their entirety.

BACKGROUND OF THE INVENTION

Detection of contact with persons infected with a deadly disease is important given the rise of a global pandemic. Social distancing directives seek to prevent the spread of deadly diseases by keeping physical separation between individuals. It has been found that the chance of infection by certain deadly diseases spread by airborne water droplets can be reduced by maintaining six to eight feet of physical separation. Within six feet transmission becomes more likely thus it would be advantageous to track when an infected person comes within a set distance such as six feet of a non-infected person to determine potential exposure events.

The rise of paper based testing and automated testing allows patients to find out whether they have become infected with a deadly disease, quickly. Due to the nature of some deadly diseases, it may not be apparent to others around the infected patient that they have the deadly disease. Thus, there is a need to notify others of possible contact with infected persons quickly and without further unnecessary contact.

The miniaturization of electronic devices has made it a habit for people to carry small electronic devices, such as cellphones or electronic identification badges or key fobs, on their person at all times. Due to their ubiquity it would be desirable to use such devices for proximity determination and contact tracing. In certain contexts, such as infectious disease contact tracing, it is useful for devices to determine their relative proximity as well as the duration of such proximity. Many modern cellphones and other small electronic devices include radios and other types of electronic transceivers. There are a number of different types of transceivers. These include acoustic transceivers, which transmit and receive sound signals, such as ultrasound, and electromagnetic transceivers, which transmit and receive signals carried by electromagnetic energy. Examples of such electromagnetic energy include radiofrequency, microwave, infrared, or visible radiation. The time of flight (ToF) of such carrier signals between devices, or signal attenuation, can be used to determine proximity.

A transceiver generally includes one or more transducers and signal processing circuitry. The transducer converts electrical input signals to a carrier signal, e.g., ultrasound or electromagnetic, or vice versa. Although a transceiver may have separate transducers for transmitting and receiving carrier signals it is common, for reasons of cost and compactness for devices to use a single transducer to send and receive carrier signals. Such devices have two modes, send and receive. While devices are in send mode, they cannot receive transmissions and while devices are in receive mode they cannot transmit signals. To compensate for this the transceivers may be switched alternatively between send and receive modes. This creates a problem for detection of devices because if the send and receive modes of the devices align then neither device is able to receive the transmitted messages. Also, if there are more devices and they all transmit at the same time it is difficult to distinguish signals from different devices. Thus it is desirable to organize send and receive periods for devices.

It is within this context that aspects of the present disclosure arise. The terms contact tracing, proximity determination, and distance determination may be used interchangeable in this disclosure since these concepts are similar.

SUMMARY

An ultrasonic beacon tracking approach is proposed to address these shortcomings in the state of the art. This disclosure relates generally to ultrasonic pulse-echo beacon tracking and specifically to a system and a method to measure the position of a transceiver relative to the position of one or more other transceivers. A device receives one or more advertise messages and determines a base station from the one or more advertise messages. The base station generates a broadcast order from at least the one or more advertise messages. A broadcast order is determined and an ultrasound message is sent according to the broadcast order. A detection period for ultrasound messages is initiated according to the broadcast order and a user may be notified of a detected ultrasound message

DETAILED DESCRIPTION

In the techniques disclosed an arbitrary number of beacons and one or more base stations may be synchronized electronically or may be synchronized ultrasonically. The relationship between beacon and base station devices may be understood as what is commonly known as a master-slave relation where the base station is like a master device and the beacon is like a slave device. According to aspects of the present disclosure, devices may be configured to act as either a base station or a beacon, and the role of base station or beacon may be assigned to devices arbitrarily.

A method for Ultrasound contact tracing and proximity determination may comprise receiving one or more advertise messages and determining a base station from the one or more advertise messages, wherein the base station generates a broadcast order from at least the one or more advertise messages. As used herein, an "advertise" message is a message that a device broadcasts relaying information that uniquely identifies the device to other devices. By way of example, and not by way of limitation, the advertise message may include common network protocol identifiers, such as a media access control (MAC) address. In some implementations, but not all, the advertise messages may be transmitted via electromagnetic carrier signal (e.g. Bluetooth signals). The relative strength of such signals at the devices that receive them may be used to determine whether a device is close enough to be enrolled in a group of one or more other devices. Specifically, a device may measure the strength of a carrier signal associated with a given advertise message and compare the measured strength to a threshold. If the strength is above the threshold the device that send the advertise message may be enrolled in the group by the base station once a base station has been assigned. A broadcast order may be determined and an ultrasound message may be sent according to the broadcast order in one device. While other devices initiate a detection period for ultrasound messages according to the broadcast order. Finally, a user may be notified of a detected ultrasound contact message.

As noted above, the assignment of a device as a base station may be arbitrary. By way of example, and not by way of limitation, two or more devices may exchange advertise messages with each other. The advertise messages may include MAC address information and each device may use this information to determine which of them will act as the base station. By way of example, each device may compare the MAC address values to each other to determine a highest value and the device with the highest MAC address value may be determined to be the base station. In alternative implementations, the device with the lowest MAC address value may be determined to be the base station. Once a device is determined to be the base station device the remaining devices that exchanged the advertise messages act as beacons. The base station device may generate a broadcast order from the information in the advertise messages and broadcast an advertise sync message that includes the broadcast order.

The base station controls the broadcast of ultrasound messages by the beacon devices via the information contained in the advertise sync message. The broadcast order determines ultrasonic transmit and receive periods for the base station and beacons. Beacons only broadcast ultrasound messages during time slots designated by the broadcast order in the advertise sync message such that the transmit periods do not overlap. The base station may send advertise sync messages at regular intervals so that base station assignment and the broadcast order may be adjusted over time to account for devices that move away from the group or are turned off, or to account for device that join the group or are turned on. The base station may transmit the advertise sync message by way of an electromagnetic signal that is received at each beacon device. By way of example, and not by way of limitation, the electromagnetic signal may be an optical, infrared, microwave, or radiofrequency signal. In some implementations, the electromagnetic signal may be an encoded radio signal such as a Bluetooth radio signal. The beacon device and the base station device may also send an advertise message. In a like manner, the advertise messages may be sent and received as electromagnetic signals.

According to aspects of the present disclosure, periods for detecting ultrasound messages may be initiated before or after broadcasting an ultrasound message according to broadcast order. In some implementations, a detection period may be initiated before broadcasting an ultrasound message according to the broadcast order and another detection period may be initiated after sending the ultrasound message. In other implementations, the ultrasound message may be sent before initiating a detection period for ultrasound signals. In yet other implementations, the ultrasound message is sent after initiating a detection period according to the broadcast order.

Notifying a user of detected ultrasound contact message may include determining a distance from the detected ultrasound contact message, comparing the distance to a contact threshold and notifying the user when the distance does not meet or exceed the threshold. In alternative implementations, notifying a user of the detected ultrasound contact may include determining a signal strength of the ultrasound contact message, comparing the signal strength of the ultrasound contact message to a threshold and notifying the user when the signal strength meets or exceeds the threshold. A message may be displayed on a user interface to notify the user of extended close contact with another user. In some implementations, a signal strength of the advertise messages may be used as a crude measure of proximity when determining whether to enroll a device in a group with other devices. This allows the system to use the ultrasound distance measurement to be activate only when the beacons are within a certain range, and saves energy resources used by the ultrasound communications. Alternatively a ratio or other function of advertise message signal strength and ultrasound signal strength may be used for this purpose.

In some implementations, a central computer or server may be used to schedule time slots for nearby beacons or base stations. In such an implementation, a base station may inventory nearby beacons and base stations through use of a unique identification code for each beacon or base station, and record the identification code and range for each nearby unit. The base station may then transmit the inventory of identification codes and ranges to the central computer or server, which may use inventories from other nearby base stations to construct a schedule of time slots for each of the base stations and beacons. The central computer or server may then transmit the schedule to each base station and/or beacon, which may then execute the schedule. The central computer may use the base station that inventoried the nearby beacons to transmit the schedule. The central computer or server may be integral to the base station. In some implementations, e.g., in a factory setting, the central computer may be configured to act as a base station, e.g., by operably connecting it to an ultrasound transceiver and electromagnetic transceiver. In such an implementation, other devices may be configured to act as beacons.

Figure 1:
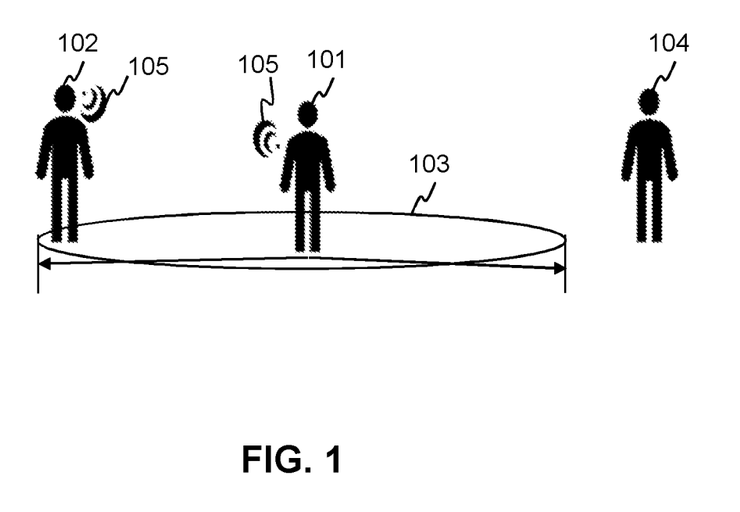
FIG. 1 is a diagram depicting social distancing with using the ultrasound contact tracing method according to aspects of the present disclosure.

FIG. 1 is a diagram depicting social distancing with using the ultrasound contact tracing method according to aspects of the present disclosure. A user 101 may have a device with ultrasound transceivers and other radio transceivers. The ultrasound contract tracing method may be enabled on the user's device and notify the user when a person 102 is within an infection contact range 103. Persons 104 not within infectious contact range of the user do not cause the device to notify the user or are logged without notifying the user.

The device may communicate 105 with the other user devices by way of radio and ultrasound communication. The devices may use the radio communication to advertise that the devices are present and those advertise messages may be used to determine a base station device. The base station device may generate a broadcast list from the received advertise messages. The base station device may send a radio communications 105 to the other devices of the users 102, 104 informing them of the broadcast order. Subsequently each device of the users 101, 102, 104 may send ultrasound messages according to the broadcast order. These ultrasound messages may be used to determine the distance from the user device to the other user devices. The user may then be notified if one or more of the other user devices are at or below a threshold range 103. For example and without limitation the user may be notified if the device of another user 102 is less than 6 feet 103 from the user's device 101.

Figure 2:
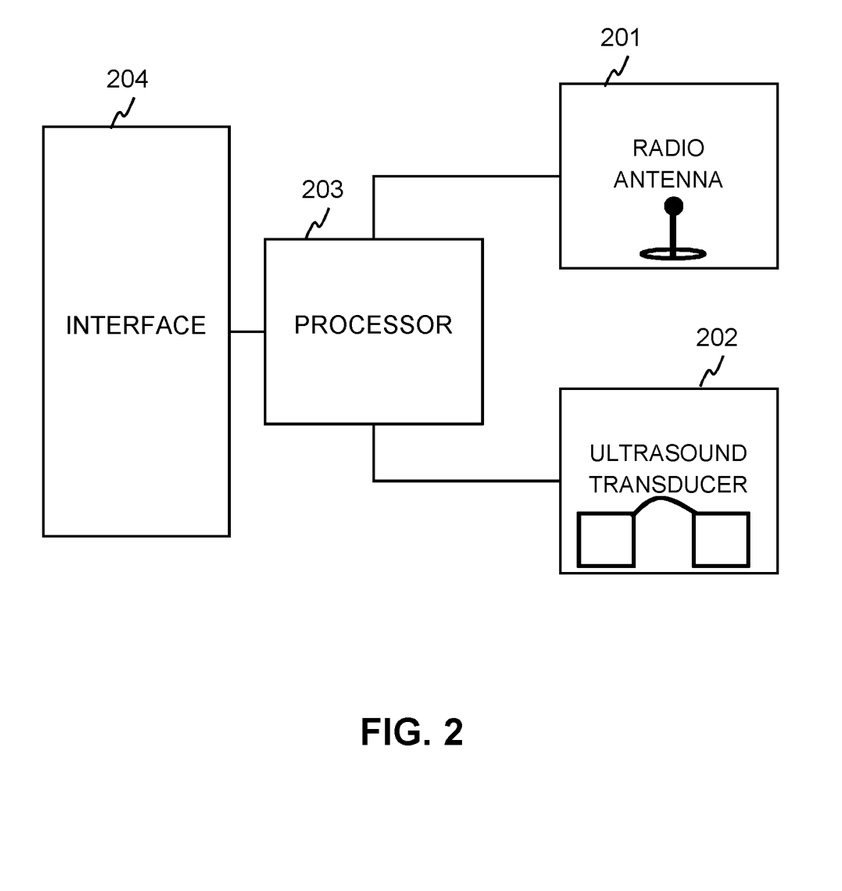
FIG. 2 is a block system diagram depicting an electronic device configured to carry out the method for ultrasound contact tracing according to aspects of the present disclosure

FIG. 2 depicts an electronic device configured to carry out the method for ultrasound contact tracing according to aspects of the present disclosure. The electronic device may include a radio antenna 201 and an ultrasonic transceiver 202 coupled to a processor 203. The Processor 203 may be a single purpose processor programmed to carry out the method for ultrasound contact tracing such as an Application Specific Integrated Circuit (ASIC), a Field Programmable Gate Array (FPGA), specialized circuitry, etc. The processor 203 may be coupled to an interface 204 for communication with the user or a larger system.

The interface 204 may communicate to the user using a screen, speaker, light arrangement, vibration device or interface type for communication with a user. Alternatively, the interface may communicate with another system and thus the interface may be a bus such as Universal Serial Bus (USB), Peripheral component Interface (PCI), serial bus, or other interface for communication between devices.

The radio antenna 201 may also include a radio transceiver configured to receive radio signal transduced through the antenna 201 and convert those radio signals to messages for the processor 203. The radio transceiver may also be configured to convert messages from the processor to radio signals and transmit those radio signals through the antenna 201. Though one radio antenna 201 is depicted there may be any number of radio antennas sufficient to provide a desired radio reception area. The radio may use a known wireless communication standard, for example and without limitation Bluetooth, 802.11a,b,c,n, Wi-Fi 6, etc.

The Ultrasound transceiver 202 may be configured to send and receive ultrasound messages. The transceiver 202 generally includes one or more ultrasonic transducers coupled to transmit and receive circuitry. Generally, the transducer can covert electrical signals to ultrasound signals in the transmit mode and vice versa in the receive mode. The transducer may be any type of transducer capable of operating at ultrasound frequencies, e.g. from about 20 kHz to about 200 kHz. Examples of such transducers include piezoelectric micromachined ultrasound transducers (PMUTs) and capacitive micromachined ultrasound transducers (CMUTs) or bulk ultrasonic transducers. The Ultrasound transceiver 202 may include single transducer unit configured to both send and receive signals or may include separate transmitter and receiver transducer units. The transmit circuitry may include a digital-to-analog converter (DAC) coupled to an amplifier that drive the transducer. The receive circuitry may include an amplifier coupled to the transducer and an analog-to-digital converter (ADC) coupled to the amplifier.

The ultrasonic transceiver 202 may include additional circuitry configured to determine the time of flight distance from transmitters of received ultrasound messages or the signal strength of the received ultrasound messages. Alternatively, the processor 203 may be configured to determine the proximity of other devices from the time of flight of received ultrasound messages from other similarly configured devices or from the signal strength of the received ultrasound messages transduced from the ultrasound transducer 202. The Ultrasound messages may be transmitted in the form of Ultrasound signals that are transduced into ultrasonic messages when they are received by the Ultrasound transducer. The Ultrasound transceiver 203 may include additional circuitry such as amplifiers and logic to convert the transduced ultrasound signals into an ultrasound message that is recognizable by the processor 203.

Figure 3:
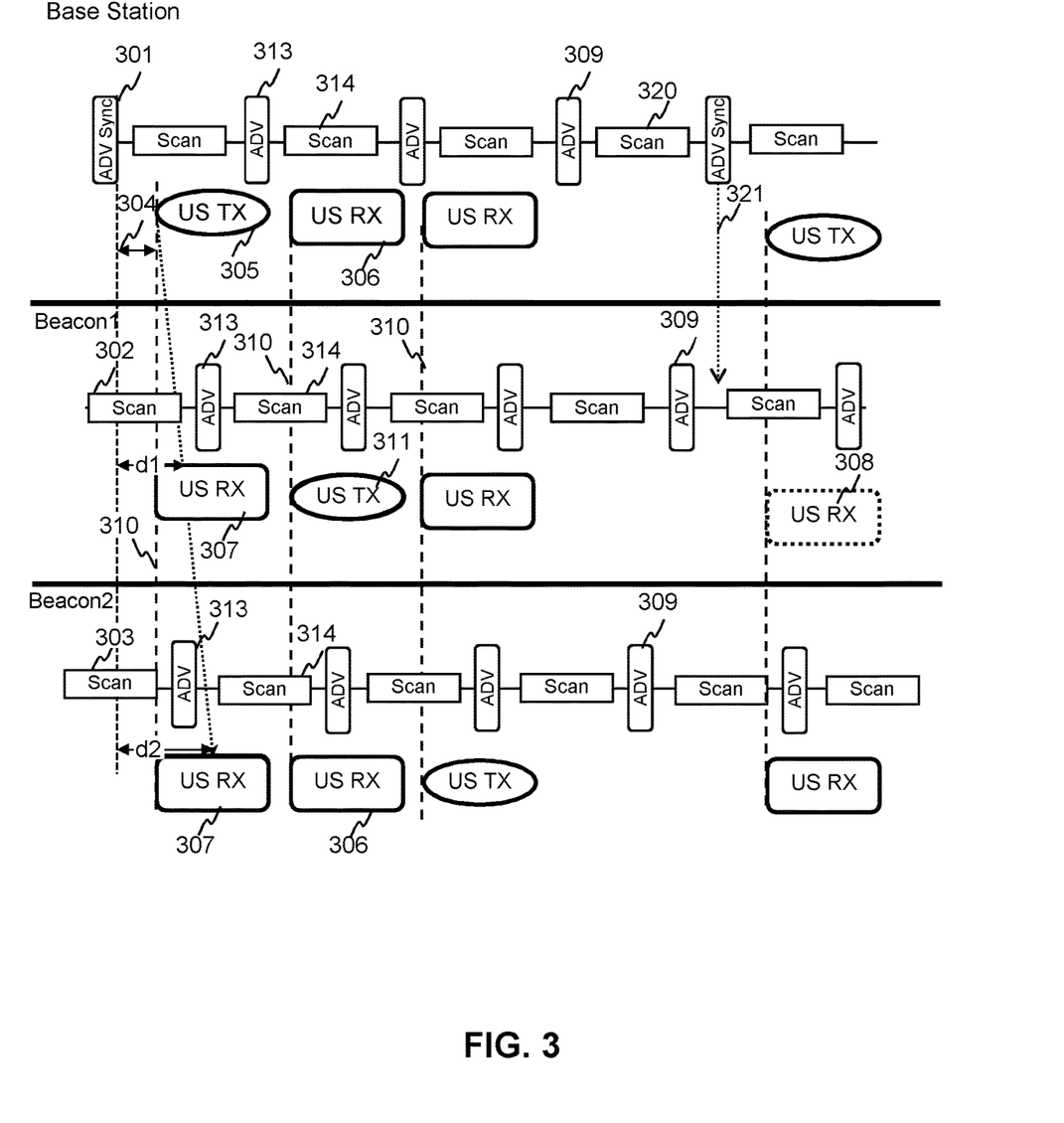
FIG. 3 is timing diagram depicting a method for ultrasound contact tracing according to aspects of the present disclosure.

FIG. 3 is timing diagram depicting the method for ultrasound contact tracing according to aspects of the present disclosure. The diagram shows the contact tracing method beginning with transmission of the ADV Sync message 301. The ADV Sync message includes a broadcast order, which orchestrates the ultrasound transmission order as shown. The transmission may be dynamic and ADV sync message 301 may be transmitted every Nth ADV message where N is the number of beacons in range and the number of broadcast order slots. If the base station stops for any reason, e.g., it is out of range or has been turned off; another enrolled beacon device may be assigned as the base station. If a base station or beacon leaves, or its signals are otherwise blocked, during an ultrasound cycle according to the broadcast order the remaining devices may continue to transmit and receive according to the broadcast order until the next ADV sync message. In the case of ADV messages sent by electromagnetic (e.g., radiofrequency) carrier, the number of beacons in range may be determined by comparing the received signal strength of the carrier signal for each ADV message to a threshold, each device that has a carrier signal strength that exceeds the threshold is a beacon device within range and may be enrolled in a group. The sending and receiving of ultrasonic signals uses a lot of power, and therefore the ultrasound distance determination should only be used when the devices are in a distance range of interest. Thus, the electromagnetic signals may be used to determine if the devices are within a certain distance range (e.g. based on signal strength), and only then the ultrasonic distance determination may be activated. By way of a non-limiting example, the electromagnetic signals may be used to determine if the devices are within 9 feet of each other, and then the ultrasonic distance determination may be activated to determine the distances with a higher accuracy.

The other beacon devices are in their reception or scanning period 302 to receive ADV messages or ADV Sync messages. As shown each device alternates between sending ADV messages 313 and scanning cycles 314. Each scanning period 314 follows an ADV message 313. Power used for electromagnetic transmission may be limited by restricting transmission of ADV and ADV Sync messages to specific time slots. The duration of the sending and scanning cycles may therefore depend on the desired power use. By way of example, and not by way of limitation, in some implementations the once send and receive cycle may last 20 to 30 milliseconds (ms) with the scanning period lasting around 10 ms. Upon receipt of the ADV sync message the beacons enact the broadcast order.

In the implementation shown the broadcast order from the ADV sync message is configured for transmission of the ultrasound message by the base station device first 105. While the base station is transmitting 305, the beacon devices are in their respective receive/detection periods and waiting 307 to detect an ultrasound transmission in accordance with the broadcast order. Each device in the broadcast order is assigned a slot and the initial ultrasound transmission 305 may begin after preparation period 304. Each slot for ultrasound transmission is a fixed period known to each device. Each device is configured to wait the preparation period, on method start, before a entering into a detection period for ultrasound transmissions 307. In this way, the slots 310 for all of the devices are synchronized. After the first device in the broadcast order slot 310 transmits an ultrasound message 305 (in this case the base station) the next device in the broadcast order transmits its ultrasound message 311, in its allotted slot 310. As before, the other devices in this slot 310 scan for the ultrasound message for the detection period 306. As shown between each slot there may be a short gap between ultrasound transmission and reception activities. This gap helps to ensure that the device has fully switched between ultrasound transmission and detection modes.

The distance to a given device can be determined from the delay between the sending of the ADV Sync message 301 and the receipt of an ultrasound message. For example, as shown in FIG. 3 the base station transmits an ultrasound signal at a known time after sending the ADV Sync message 301. In the illustrated example this occurs after the preparation period 304, the duration of which $D_{prep}$ may be included in the ADV Sync message. One beacon device (Beacon1) receives the ultrasound message after a delay d1 and another beacon device (Beacon2) received the ultrasound message after a delay d2. The time of flight between the base station and Beacon1 (TOF1) may be determined from d1 as TOF1=d1-$D_{prep}$ and the distance between them may be determined by dividing TOF1 by the speed of sound c. Similarly, the distance between the base station and Beacon2 may be determined from d2. In some implementations, if the speed of sound can be regarded as sufficiently constant, e.g., varies no more than about 10% from some reference value, it may be sufficient to simply determine TOF1 in order to estimate proximity between the base station and Beacon1. In some implementations, a temperature sensor may be used for a better estimate of the speed of sound. For applications requiring greater accuracy each device may include a temperature sensor and the device may take temperature readings from such a sensor into account when determining distance.

The process for determining distances from ultrasound messages received from Beacon1 or Beacon2 is similar that that discussed above but instead of $D_{prep}$ would use the delay $D_1$ between sending the ADV Sync message and the beginning of the transmission period for Beacon1. The broadcast order in the ADV Sync message 301 may specify $D_1$ and similarly specify a corresponding delay $D_2$ for Beacon2.

Meanwhile the base station and beacon devices continue to send ADV messages 313 and scan for reception of ADV messages 314. This allows devices in the method to be aware of, and track other devices outside the nearby area that enter the nearby area. This way, devices in proximity are aware of which devices are present and can be prepared for the next broadcast cycle.

When every device in the broadcast order has transmitted their ultrasound messages, the ultrasound messaging period ends and the method may begin again with devices sending out initial ADV messages 309, reception of ADV message 320 and assignment of a base station device. In some rare cases and misalignment of broadcast and scanning cycles may result in a device missing reception of the ADV sync message 321. The device that missed the sync message will not initiate a detection period for an ultrasound message 308, as it does not receive a broadcast order. There is thus a tradeoff in setting the transmit and receive cycles between ensuring reception of ADV messages and desired power usage.

Figure 4:
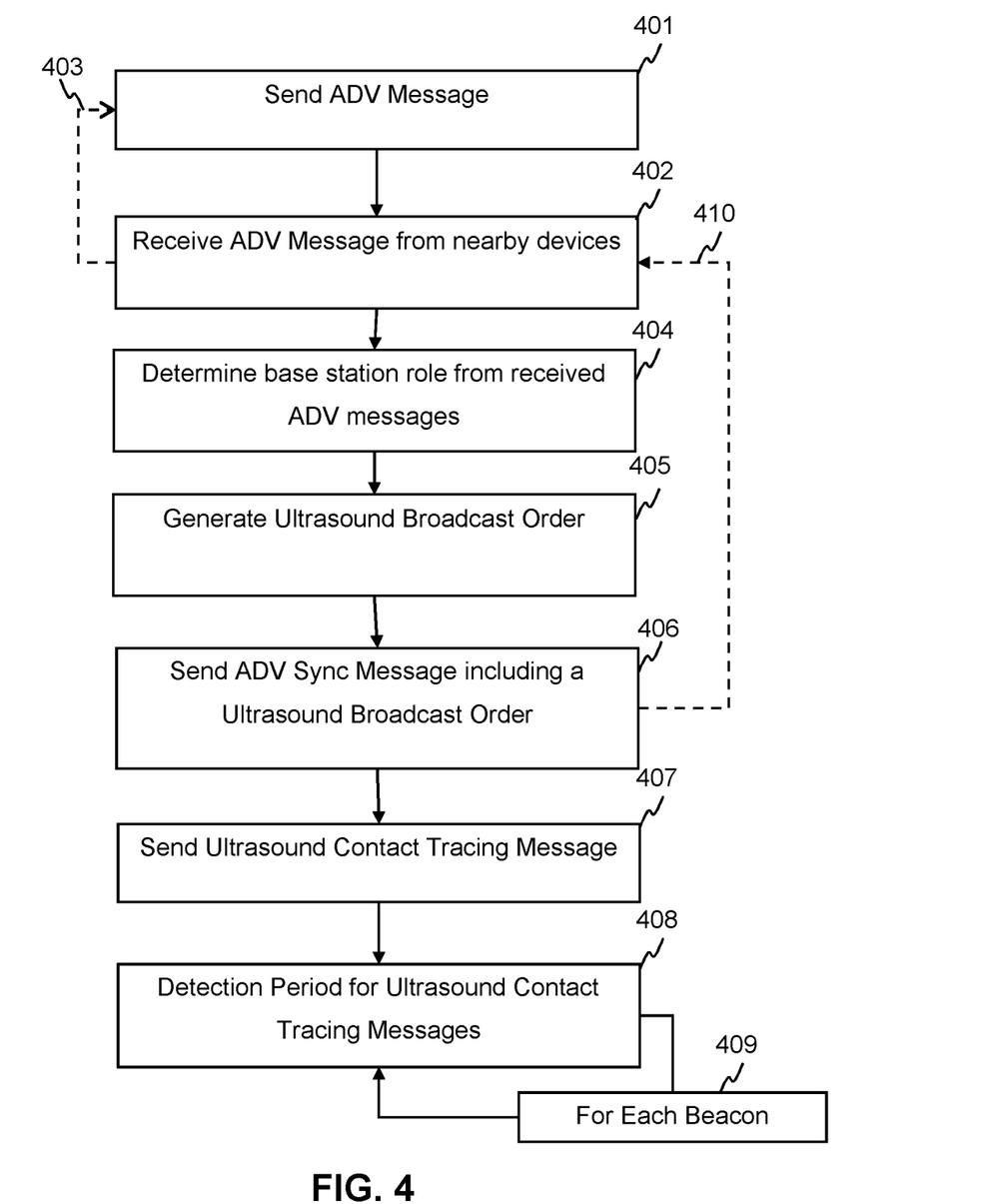
FIG. 4 is a flow diagram depicting a method of ultrasound contract tracing with a base station device according to aspects of the present disclosure.
Figure 5:
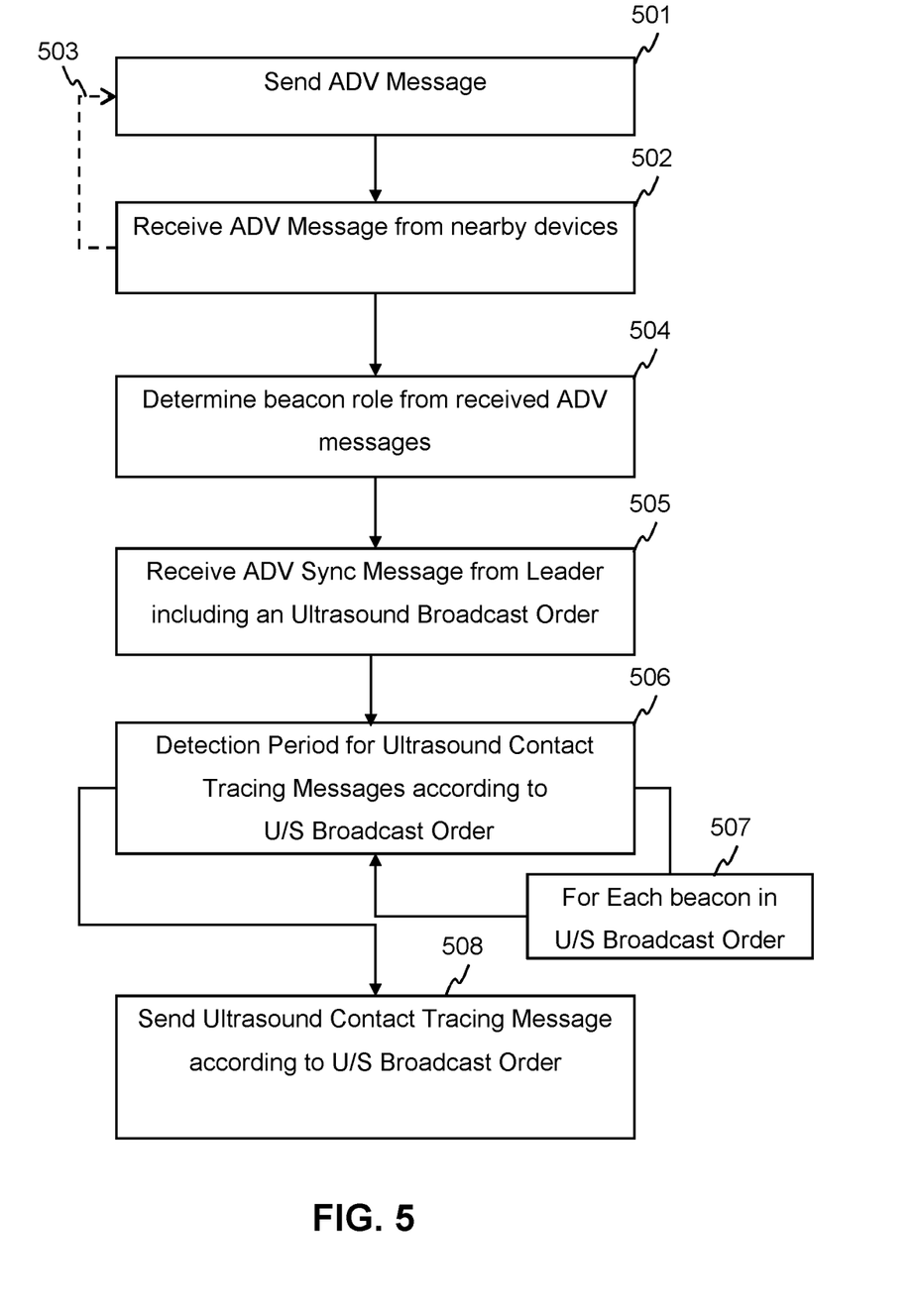
FIG. 5 is a flow diagram showing a method of ultrasound contract tracing with a beacon device according to aspects of the present disclosure.

The specific behavior of base station and beacon devices may be understood in further detail by referring to FIG. 4 and FIG. 5, respectively. FIG. 4 is a flow diagram depicting a method of determining proximity with a base station device according to aspects of the present disclosure. Initially the device may not have a role in the ultrasound proximity determination network thus the device without a role will be referred to herein as the unenrolled device. As shown at 401 the unenrolled device may broadcast advertise (ADV) messages to the area around the device for detection by other unenrolled devices in the area. Furthermore the ADV messages may also be detected by other devices that are already enrolled together in an existing group. These advertise messages may be in the form of radio signals. The advertise message contents may include a unique unenrolled device id such as a MAC address or a custom device identifier. In some implementations the advertise message may include information regarding an orientation of the device based on an inertial measurement unit (IMU) or magnetic sensor. Such information can be significant if, e.g., a threshold proximity of two users for contact tracing depends on whether they are facing each other or a oriented back to back, as this may influence the ultrasound communication.

After broadcasting the advertise message 401 the unenrolled device waits for a reception period during this reception period the antenna is monitored for reception of any advertise messages received from other nearby devices 402 in the area. Advertise messages received from other devices nearby may be logged by the unenrolled device in memory to keep track of all of the other nearby devices. Alternatively, some information from the received Advertise messages may be logged. For example and without limitation the MAC addresses of nearby devices may be determined from the received advertise messages and stored in memory.

After the reception period or scanning period 402 the unenrolled device may repeat 403 the broadcast of Advertise messages 401. This ensures that devices are promptly notified when the unenrolled device is in the nearby area.

Concurrently, the unenrolled device may determine the base station role from the received ADV messages 404. Devices exchanging ADV messages may compare a signal strength of the signals carrying those messages to some threshold to determine if they are sufficiently nearby to be enrolled in a group. Relative signal strength may also be used in cases where a device has to decide whether to enroll in one of two or more different groups. Each enrolled device may use a standard procedure known to all the other nearby devices to determine the base station device. In this way, the each nearby device may be aware of which device is the base station device and which devices are beacons. For example and without limitation the enrolled devices may use the MAC address of enrolled device and nearby devices to determine the base station device. The enrolled device and nearby devices may choose the device with the device with the lowest MAC address or the Highest MAC address to be the base station device. If the enrolled device determines that it has the lowest or highest MAC address it acts as the base station device at 404. Every device shares the same criteria for determining the base station device and every device in the area receives advertise broadcasts therefore every device determines the same base station device without a broadcast containing information about what device is the base station. While choosing the base station device based on MAC address is disclosed many other standards for base station determination are possible as long, as the metric is shared and implemented similarly in each of the enrolled devices. This allows the base station to be determined as devices leave or join the group. By way of example, a beacon enrolled in a group may have the second lowest MAC address in the group. When the base station exits the group the beacon with the second lowest MAC address becomes the base station.

Once an enrolled device determines that it the base station 404, the base station device may generate an ultrasound broadcast order 405. The ultrasound broadcast order may include every other nearby device (now beacon devices) logged from the received ADV messages. In some implementations, the broadcast order may also include the base station device. In other implementations, the base station device broadcasts the ultrasound message first or last by default. The ultrasound broadcast order allots a broadcast position for each beacon device and in some cases the base station device. This ensures that the beacons and base station do not broadcast ultrasound transmissions simultaneously and interfere with one another.

After the ultrasound broadcast order has been generated 405 the base station device broadcasts, the ultrasound broadcast order to the beacons 406 in the form of an ADV sync message, which includes the ultrasound broadcast order. The ADV synch message may include other information in addition to the broadcast order, e.g., the timing of ultrasound transmission relative to transmission of ADV messages, the length of ultrasound transmission and ultrasound reception, the number of beacons in the cycle, and the type or pattern of ultrasound signals to be used for devices in the group. The base station device may broadcast the ADV sync message to the beacons as an electromagnetic transmission. Once the ADV sync message is sent 406, the base station may continue to send ADV messages to beacons 401 and receive ADV messages at 402. Where electromagnetic signals are used for ADV messages the ADV transmission cycle and the ultrasound transmission cycle may be synched or independent. Regular sending and receiving of ADV messages allows the base station to keep track of devices that may enter the area around the base station while the ultrasound transmission and detection cycle is in progress.

Following the broadcast of the ADV message the Ultrasound transmission 407 and reception may begin. In the implementation shown in FIG. 4 the base station sends an ultrasound message 407 first. In an alternative implementation, the base station may send the ultrasound message last. In yet other alternative implementation, the base station may send the ultrasound message according to the broadcast order for example and without limitation neither first nor last. The ultrasound message from the base station may be used by the beacon to determine the beacon's relative location to the base station. When one beacon transmits, the other devices, including the base station, receive. Each device can determine its relative proximity/distance to the transmitting beacon, e.g., from time of flight or ultrasound signal strength. Because the ultrasound cycle includes a broadcast period for each enrolled device, the proximity/distance between all enrolled devices can be determined. In other words, at the end of the cycle, each device knows the proximity with all other enrolled devices.

The Ultrasound detection period may begin after transmission of the ultrasound message 408. During the detection period, the base station waits for an incoming transmission from beacon devices, each of which transmits only during a predetermined slot in accordance with the broadcast order. This prevents interference between transmission by the base station and the reception of ultrasound messages transmitted by the beacons. As shown there may an ultrasound detection period for each beacon 409 in the broadcast order. In alternative implementations, the detection period may occur first with broadcast of the Ultrasound message occurring last. In yet other alternative implementation the Ultrasound message broadcast may be between detection periods according to the ultrasound broadcast order. After the base station broadcasts an ultrasound message and every detection period in the broadcast order is complete the method repeats starting at 401. Additionally, any ADV messages received during the ultrasound transmission and detection period may be logged and used during the next repetition of the method starting at 401.

The nature of the ultrasound transmissions at 408 and detection at 409 depends partly on the proximity range of interest and partly on power use considerations. In general, the power use depends on the strength and duration of the ultrasound transmission. High power is desirable to ensure the signal is detected and short duration is desirable to conserve power. Also, where proximity is determined from time of flight, it is desirable for the ultrasound reception periods to be at least as long as the time of flight for the proximity range of interest, if not longer. For example, where the proximity range of interest is, say 2 meters or less, and the speed of sound in air is about 343 meters per second, the duration of the reception period is desirably about 0.006 seconds (6 milliseconds) or longer. For such implementations it is also desirable that the ultrasound transmission begin at a known time within the transmission period, e.g., at the very beginning. This way, the time of flight to a given device may be estimated from the time of arrival relative to the beginning of the transmission period for that device.

The behavior of beacon devices is similar but not identical to that of base station devices. FIG. 5 is a flow diagram showing a method of ultrasound contract tracing with a beacon device according to aspects of the present disclosure. Similar to the base station, initially the unenrolled device sends an ADV message 501 over a network. The ADV message may be sent by electromagnetic, e.g., radiofrequency or any other transmission method detectable by other nearby devices.

After broadcasting the advertise message 501 the unenrolled device waits in a reception or scanning period during this reception period the antenna is monitored for reception of any advertise messages sent from other nearby devices 402 in the area. Advertise messages received from other devices nearby may be stored or logged by the unenrolled device in memory to keep track of all of the other nearby devices. Alternatively, only some information from the received Advertise messages may be logged or stored. For example and without limitation the signal strength and/or MAC addresses of nearby devices may be determined from the received advertise messages and stored in memory. As discussed above, devices exchanging ADV messages may compare the strength of the signals carrying those messages to some threshold to determine if they are sufficiently nearby to be enrolled in a group.

After the reception period 502 the unenrolled device may repeat 503 the broadcast of Advertise messages 501. This ensures that devices are promptly notified when the unenrolled device is in the nearby area. As with the base station, regular transmission and monitoring of ADV messages allows a beacon device to determine when the group's composition has changed.

Once enrolled, the device may determine the base station role from the received ADV messages 504. The device may use a standard known to all the other nearby devices to determine the base station device. In this way, each nearby device may be aware of which device is the base station device and which devices are beacons. Every device shares the same criteria for determining the base station device and every device in the area receives advertise broadcasts therefore every device determines the same base station device without a broadcast containing information about what device is the base station. Once a device is enrolled as a beacon it waits to receive an ADV sync message from the base station to determine when to transmit ultrasound messages.

The beacon device waits in a reception or scanning period to receive a broadcast of an ADV sync message from the base station 505 or other ADV messages. The ADV Sync message includes an ultrasound broadcast order, which informs the beacon device of the beacon device's ultrasound broadcast position among other beacon devices and the base station device in the area. As noted above, ADV synch message may include other information in addition to the broadcast order, e.g., the timing of ultrasound transmission relative to transmission of ADV messages, the length of ultrasound transmission and ultrasound reception, the number of beacons in the cycle, and the type or pattern of ultrasound signals to be used for devices in the group. The broadcast order may include a broadcast time for the beacon device or beacon devices or beacon devices and the base station device. Alternatively, the broadcast order may include a broadcast slot for the beacon device or a broadcast slot for each beacon device or a broadcast slot for each beacon device and the base station device. The broadcast slot may be a predefined period of time wherein the beacon device or the base station device transmits an ultrasound message. Between each broadcast slot there may be a predefined separation period. When it is not the beacon's broadcast slot, the beacon device is in a detection period to detect an ultrasound message from another beacon or the base station device. This prevents beacons and the base station from interfering with each other and eliminates the possibility that two devices might make ultrasound transmissions at the same time. Additionally, because the broadcast slot and separation period are predefined the broadcast order may be a simple ordered list of beacon devices. The ordered list may include the base station device in some implementations. Additionally in some implementations, the broadcast order may include the broadcast slot time length and separation period time length to ensure that every device has the same broadcast slot time length and separation period time length.

After reception of the ADV sync message including a broadcast order beacon device may enter an ultrasound detection period wherein the device is configured to receive ultrasound broadcasts according to the broadcast order as indicated at 506. The detection period may be repeated for every other device in the broadcast order as indicated at 507. The beacon device may send an ultrasound message as indicated at 508 during a broadcast slot designated according to the broadcast order. The beacon device may send the ultrasound message at any position in the broadcast order thus in some implementation the beacon device may send an ultrasound message before the detection period or at a point between detection periods. For each period that the beacon device is listening, it knows from the broadcast order which beacon (or base station) is transmitting during that period and can determine the relative proximity of that device. Similarly, when it is the beacon's turn to transmit the other devices know that it is transmitting and can determine its relative proximity. As with the base station, the nature of the ultrasound broadcasts at 506 and detection at 507 depends partly on the proximity range of interest and partly on power use considerations.

Figure 6:
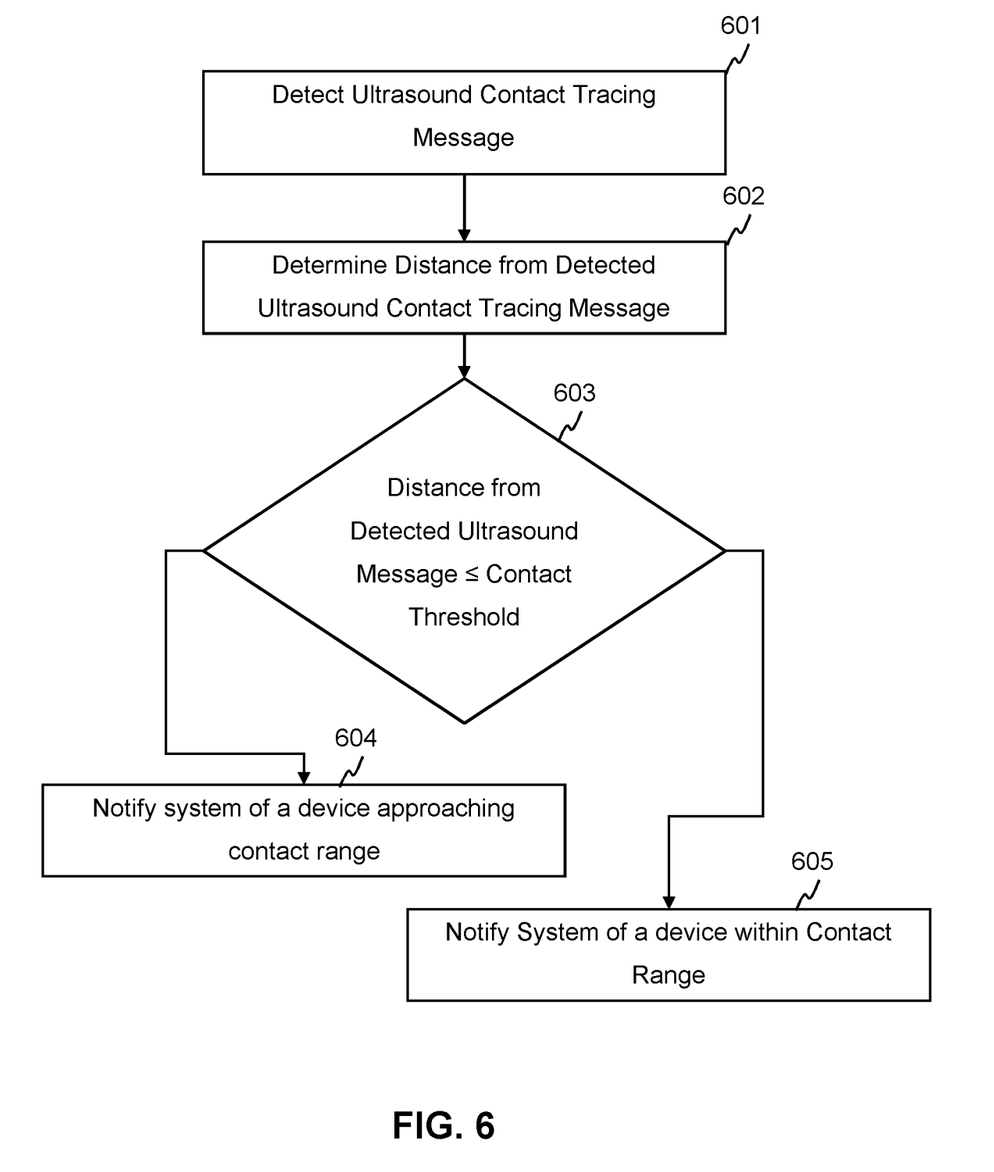
FIG. 6 is a flow diagram that depicts actions of the beacon devices and base station device upon detection of an ultrasound message.

FIG. 6 is a flow diagram that depicts the actions of the beacon devices and base station device upon detection of an ultrasound message. Upon detection of an ultrasound message at 601, the device determines the distance of the device from the origin point of the ultrasound message as indicated at 602. The beacon can determine which of the other devices sent the messages because of the known broadcast order. The distance of the device from the origin point of the ultrasound message may be determined at as indicated at 602 by any distance determination for ultrasound signals for example and without limitation time of flight, signal strength etc.

Time of flight may use a known broadcast time for each device and the speed of ultrasonic signals through air determine the distance from the device to the origin of the ultrasound message. In alternative implementations distance may be estimated from relative signal strength. Distance determination using signal strength may include the use of a known ultrasound broadcast signal strength for ultrasound transducers of the beacons and the base station with the known absorption of ultrasound signals by air at ambient temperature pressure and humidity to determine the general distance of the device from the origin of the ultrasound signal. For more information on the absorption of ultrasound signals by air see A. Vladisauskas "Absorption of Ultrasonic Waves in Air" 1392-2114 Ultragarsas, Nr. 1(50). 2004.

After determination of the proximity of the device from the origin of the ultrasound message at 602 the distance is compared to a threshold as indicated at 603. The threshold may be based on infectious disease social distancing. For example and without limitation the infectious disease social distancing contact distance may be based on the Coronavirus disease 2019 airborne droplet infection distance of two meters or about six feet. Also relevant is the time of proximity less than the critical threshold. This may be determined by recording the times of each ultrasound message that is received so that proximity of each device may be established as a function of time. Such information may be useful for contact tracing. The proximity may be determine with more than a single threshold, and the time within the different thresholds may be calculated. An exposure metric may be determine between users, which takes into account the proximity/distance and time at that proximity, for example, by multiplying time and distance. Different weights may be applied to different proximities to account for non-linearity of exposure. The proximities, times, and exposures with respect to each of the other devices may be stored in the device for later use.

When the distance of the device from the origin of the ultrasound message is less than the threshold, the system sends a notification of a device within contact range as indicated at 605. This notification may store the device ID of the device within the threshold distance determined from at least the broadcast order, for later contact tracing purposes.

The notification may be sent through an interface to inform the user of the contacts represented by devices that are closer than the safe social distance range. The notification may also be to a larger system such as a computer or server to store the device ID for contact tracing. Additionally, a time may be included with the notification to inform the user of when the contact took place and a duration of the contact. In some implementations, the user may be notified immediately. In other implementations, the information may be stored for contract tracing after the fact, e.g., after it is determined that a user of one of the devices was sick.

As indicated at 604, when the distance of the device from the origin of the ultrasound message is greater than the threshold the system may send a notification that no devices are within contact range or that devices are approaching contact range. In some cases, reception of an ultrasound message indicates that the devices are close to the threshold range and such information may be useful for contact tracing purposes. In some alternative embodiments a notification is not sent when the distance does not meet or exceed the threshold.

Figure 7:
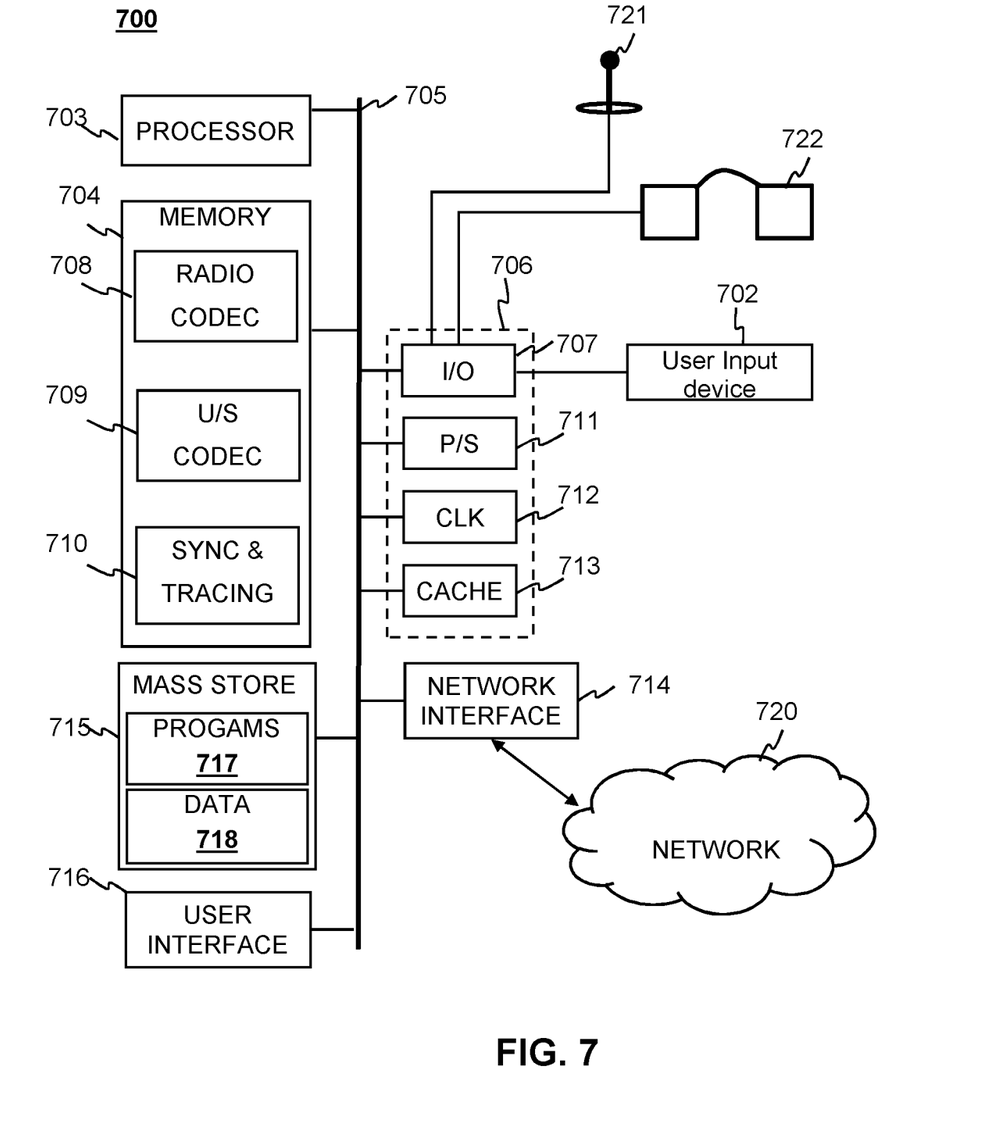
FIG. 7 is a block diagram showing a system configured carry out the method of ultrasound contact tracing according to aspects of the present disclosure.

FIG. 7 depicts the system 700 configured carry out the method of ultrasound contact tracing according to aspects of the present disclosure. The system 700 may include one or more processor units 703, which may be configured according to well-known architectures, such as, e.g., single-core, dual-core, quad-core, multi-core, processor-coprocessor, cell processor, and the like. The system 700 may also include one or more memory units 704 (e.g., random access memory (RAM), dynamic random-access memory (DRAM), read-only memory (ROM), and the like).

The processor unit 703 may execute one or more programs 717, portions of which may be stored in the memory 704 and the processor 703 may be operatively coupled to the memory, e.g., by accessing the memory via a data bus 705. The programs 717 may be configured provide information to carry out the message synchronization and contact tracing distance determination 710 as described in FIGS. 3, 4 and 5. Additionally, the Memory 704 may contain information necessary to encode or decode radio signals 708 and encode or decode ultrasound signals 709. The message synchronization and contact tracing distance determination information may also be stored as data 718 in the Mass Store 718.

The system 700 may also include well-known support circuits, such as input/output (I/O) 707, circuits, power supplies (P/S) 711, a clock (CLK) 712, and cache 713, which may communicate with other components of the system, e.g., via the bus 705. The computing device may include a network interface 714. The processor unit 703 and network interface 714 may be configured to implement a local area network (LAN) via a suitable network protocol, e.g., Ethernet for a LAN. The computing device may optionally include a mass storage device 715 such as a disk drive, CD-ROM drive, tape drive, flash memory, or the like, and the mass storage device may store programs and/or data. The system may also include a user interface 716 to facilitate interaction between the system and a user. The user interface may include a display device such as monitor, Television screen, speakers, headphones or other devices that communicate information to the user. The display device may include visual, audio, or haptic display or some combination thereof. A user input device 702 such as a mouse, keyboard, game controller, joystick, etc. may communicate with an I/O interface and provide control of the system to a user.

The I/O 707 may include one or more radio antennas 721 and one or more Ultrasound transceiver 722. The radio antennas 721 may be configured send and receive radio signals according to one or more wireless protocols for example and without limitation Bluetooth, 802.11a, b, g, N, etc. The one or more ultrasound transceiver 722 configured to send and receive ultrasound messages. The ultrasound transceiver 722 generally includes one or more ultrasonic transducers coupled to transmit and receive circuitry. Generally, the transducer can covert electrical signals to ultrasound signals in the transmit mode and vice versa in the receive mode. The transducer may be any type of transducer capable of operating at ultrasound frequencies. Examples of such transducers include piezoelectric micromachined ultrasound transducers (PMUTs) and capacitive micromachined ultrasound transducers (CMUTs). The Ultrasound transceiver 722 may include single transducer unit configured to both send and receive signals or may include separate transmitter and receiver transducer units. The transmit circuitry may include a digital-to-analog converter (DAC) coupled to an amplifier that drive the transducer. The receive circuitry may include an amplifier coupled to the transducer and an analog-to-digital converter (ADC) coupled to the amplifier.

Figure 8:
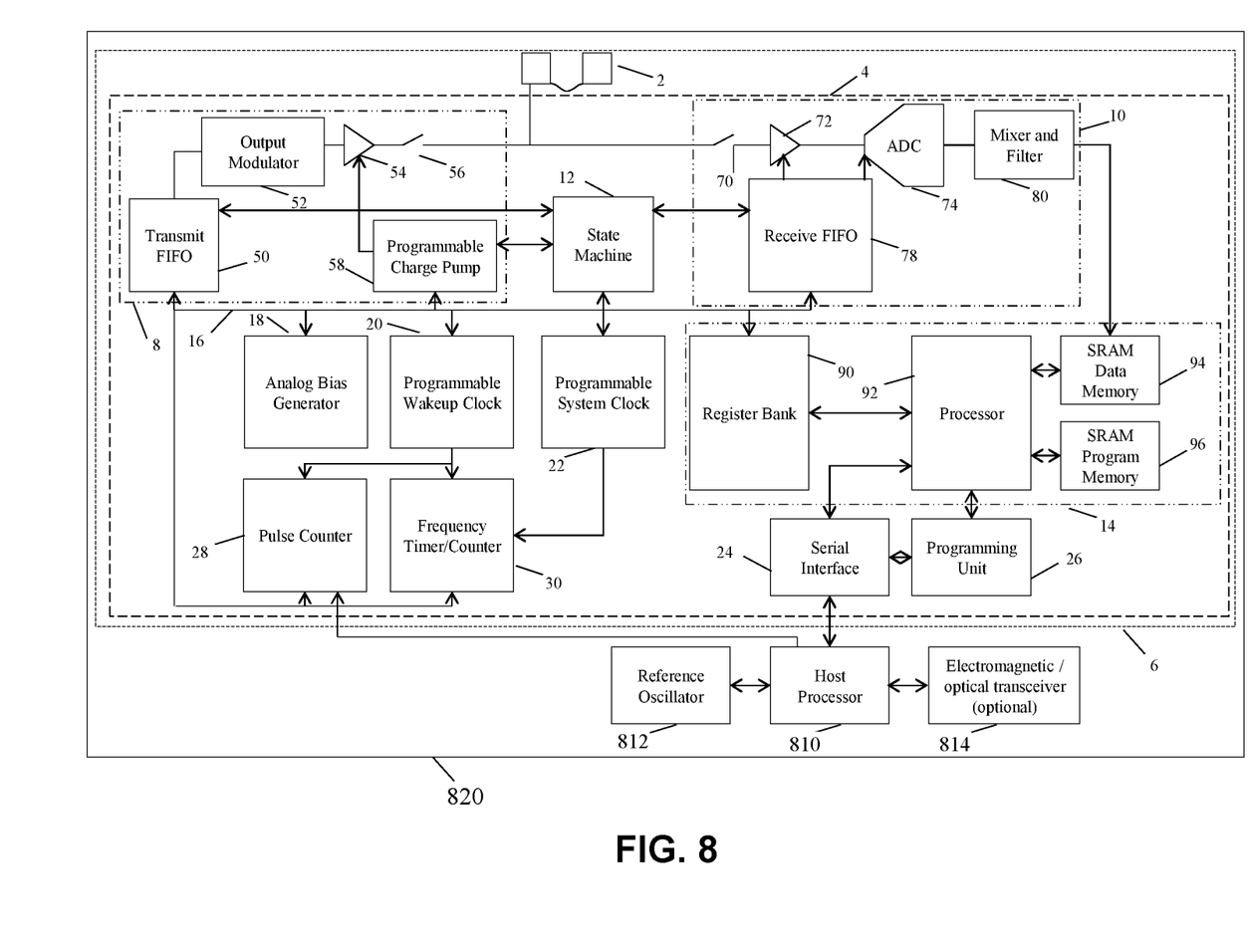
FIG. 8 is a block system diagram depicting an Ultrasonic transceiver containing an ultrasonic transducer controlled by an electrical circuit according to aspects of the present disclosure.

Refer now to FIG. 8. Ultrasonic transceiver 6 contains an ultrasonic transducer 2, which is controlled by electrical circuit 4. Electrical circuit 4 contains a transmitter module 8 and a receive module 10 which are controlled by a state machine 12. A digital controller 14 controls the state machine 12, a programmable wake-up clock 20, a programmable system clock 22, a pulse counter 28, and a frequency timer/counter 30. Digital controller 14 interfaces with a programming unit 26, which is used to program digital controller's program memory 96. Serial interface 24 is used by digital controller 14 to communicate with host processor 810. Host processor 810 can use a reference oscillator 812 to generate accurate time delays. In some implementations, the transceiver 6 may optionally include an electromagnetic/optical transceiver 814 coupled to the host processor 810 to implement additional channels of communication for trigger pulses or synchronization signals and other information to other similarly configured transceivers.

In one implementation, a high precision reference oscillator 812 is used to calibrate a low precision wake-up clock 20. Host processor 810 uses serial interface 24 to signal digital controller 14 to configure pulse counter 28 and programmable wake-up clock 20 to begin a calibration state. Host processor 810 uses reference oscillator 812 to create a reference pulse, which triggers pulse counter 28. Pulse counter 28 counts the clock cycles of programmable wake-up clock 20 which occur during the reference pulse and stores this count as a calibration result. For example, if the reference pulse is 100 ms long, and programmable wake-up clock has a frequency of 10 kHz, the pulse counter will contain a calibration result count of 1000 at the end of the reference pulse.

Following the conclusion of the calibration procedure, host processor 810 can query the result of the calibration using serial interface 24 to communicate with digital controller 14. Ultrasonic transceiver 6 can also use the result stored in pulse counter 28 to generate accurate delays. In order to generate an accurate delay, ultrasonic transceiver 6 loads the calibration result in pulse counter 28 into programmable wakeup clock 20. Programmable wakeup clock 20 will now wake-up with a period approximately equal to that of the reference pulse generated by host processor 810 and reference oscillator 812. In order to generate delays of different lengths, digital controller 14 may multiply, bit shift, or add to the original calibration result before loading the modified result into programmable wake-up clock 20.

In an implementation, programmable system clock 22 may be used in addition to programmable wake-up clock 20 to generate a high precision delay. In this implementation, the delay to be implemented is required to be an integer multiple of the period of programmable wake-up clock 20. Programmable system clock 22 is a high frequency oscillator. In some implementations programmable system clock 22 may be a voltage controlled oscillator or a digitally controlled oscillator. In general, the actual period of programmable system clock 22 may be unknown. In order to determine the period of programmable system clock 22, frequency timer/counter 30 is used to count a number of cycles of programmable wake-up clock 20. The number of cycles of programmable wake-up clock 20 to count may be chosen to be equal to the calibration result from pulse counter 28 or a divided or multiplied version of this calibration result. The frequency timer/counter 30 counts the number of programmable system clock 22 cycles, which fall during the counts of the programmable wake-up clock 22. The resultant frequency count allows the period of the programmable system clock 20 to be determined. It also determines the ratio of the programmable system clock 20 to the programmable wake-up clock 22.

Although the description herein contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. For example, while circular embodiments are shown, the acoustic array elements may have many different shapes such as square, rectangular, hexagonal, octagonal, and so on. All such variations that would be apparent to one of ordinary skill in the art are intended to fall within the scope of this disclosure. It will also be appreciated that the drawings are not necessarily to scale, with emphasis being instead on the distinguishing features of the device disclosed herein.

All cited references are incorporated herein by reference in their entirety. In addition to any other claims, the applicant(s)/inventor(s) claim each and every embodiment of the invention described herein, as well as any aspect, component, or element of any embodiment described herein, and any combination of aspects, components or elements of any embodiment described herein.

What is claimed is:

1. A method for determining proximity of two or more electronic devices, comprising:
   a) exchanging one or more electromagnetic advertise messages with an electronic device, wherein the electronic device exchanges the one or more electromagnetic advertise messages with one or more different electronic devices;
   b) determining a base station from the one or more received advertise messages from the one or more different electronic devices with the electronic device, wherein the base station generates a broadcast order from at least the one or more advertise messages;
   c) determining a broadcast order for transmission of ultrasonic messages with an ultrasonic transceiver incorporated into the electronic device, wherein the broadcast order determines ultrasonic transmit and receive periods for the electronic device and the one or more different electronic devices, wherein ultrasonic transmit periods for the electronic device and the one or more different electronic devices do not overlap;
   e) broadcasting an ultrasound message according to the broadcast order with the electronic device;
   f) initiating a detection period for ultrasound messages according to the broadcast order with the electronic device;
   g) determining a proximity of one or more of the one or more different electronic devices relative to the electronic device.

2. The method of claim 1 wherein determining a broadcast order further comprises generating a broadcast order from at least the one or more advertise messages and broadcasting an advertise sync message including the broadcast order.

3. The method of claim 1, further comprising using a signal strength of the one or more received advertise messages to determine whether to enroll a given device of the one or more different electronic devices in a group with the electronic device and one or more remaining devices of the one or more different electronic devices.

4. The method of claim 1, further comprising notifying a user of a detected ultrasound contact when a proximity of one or more of the one or more different electronic devices is less than a threshold proximity.

5. The method of claim 1, further comprising storing a proximity and a duration of proximity of one or more of the one or more different electronic devices.

6. The method of claim 1, further comprising storing a duration that the electronic device is within a threshold proximity to one or more of the one or more different electronic devices.

7. The method of claim 1 wherein determining a broadcast order further comprises receiving a broadcast order from an advertise sync message.

8. The method of claim 7 wherein the broadcast order is received from the base station device determined at b).

9. The method of claim 7 wherein the advertise sync message is received from a radiofrequency signal.

10. The method of claim 1 further comprising sending an advertise message.

11. The method of claim 1 wherein the advertise messages are received from a radio signal.

12. The method of claim 1 further comprising initiating a detection period before sending an ultrasonic message according to the broadcast order and initiating a detection period after sending the ultrasonic contact message according to the broadcast order.

13. The method of claim 1 wherein the ultrasound message is sent before initiating a detection period.

14. The method of claim 1 wherein the ultrasound message is sent after initiating a detection period according to the broadcast order.

15. The method of claim 1 wherein notifying a user of a detected ultrasound contact message includes determining a distance from the detected ultrasound contact message, comparing the distance to a contact threshold and notifying the user when the distance does not meet or exceed the threshold.

16. The method of claim 1 wherein notifying a user of the detected ultrasound contact method includes determining a signal strength of the ultrasound contact message, comparing the signal strength of the ultrasound contact message to a threshold and notifying the user when the signal strength meets or exceeds the threshold.

17. The method of claim 1 wherein notifying the user includes displaying a message on a user interface.

18. The method of claim 1, wherein the electronic device cannot transmit and receive ultrasonic messages at the same time.

19. A system for determining proximity of two or more electronic devices, comprising:
- a memory;
- an ultrasound transceiver;
- a processor coupled to the memory and the ultrasound transceiver;
- non-transitory instructions embedded in the memory that when executed cause the processor to carry out a method for determining proximity of two or more electronic devices comprising:
  - a) exchanging one or more electromagnetic advertise messages, wherein the system exchanges the one or more electromagnetic advertise messages with one or more different electronic devices;
  - b) determining a base station from the one or more received advertise messages from the one or more different electronic devices wherein the base station generates a broadcast order from at least the one or more advertise messages;
  - c) determining a broadcast order for transmission of ultrasonic messages with the ultrasonic transceiver, wherein the broadcast order determines ultrasonic transmit and receive periods for the system and the one or more different electronic devices, wherein ultrasonic transmit periods for the electronic device and the one or more different electronic devices do not overlap;
  - e) broadcasting an ultrasound message with the ultrasound transceiver according to the broadcast order;
  - f) initiating a detection period for ultrasound messages with the ultrasound transceiver according to the broadcast order; and
  - g) determining a proximity of one or more of the one or more different electronic devices relative to the electronic device.

20. The system of claim 19 further comprising a radiofrequency receiver or transceiver configured to receive an advertise sync message containing the broadcast order.

21. The system of claim 19 further comprising a radiofrequency receiver or transceiver, wherein the advertise messages are received from a radiofrequency signal transduced using the radiofrequency receiver or transceiver.

22. The system of claim 19 wherein the system is configured to notify the user by displaying a message with a user interface.

23. The system of claim 19, wherein the system cannot transmit and receive ultrasonic messages at the same time.

24. A computer readable medium having non-transitory instructions embedded thereon that when executed by a computer cause the computer to carry out a method for determining proximity of two or more electronic devices comprising:
  - a) exchanging one or more electromagnetic advertise messages, wherein the computer exchanges the one or more electromagnetic advertise messages with one or more different electronic devices;
  - b) determining a base station from the one or more received advertise messages from the one or more different electronic devices, wherein the base station generates a broadcast order from at least the one or more advertise messages;
  - c) determining a broadcast order for transmission of ultrasonic messages with an ultrasonic transceiver controlled by the computer, wherein the broadcast order determines ultrasonic transmit and receive periods for the ultrasonic transceiver controlled by the computer and the one or more different electronic devices, wherein ultrasonic transmit periods for the ultrasonic transceiver controlled by the computer and the one or more different electronic devices do not overlap;
  - e) broadcasting an ultrasound message according to the broadcast order;
  - f) initiating a detection period for ultrasound messages according to the broadcast order; and
  - g) determining a proximity of one or more of the one or more different electronic devices relative to the electronic device.

* * * * *